United States Patent
Li et al.

(10) Patent No.: US 10,517,104 B2
(45) Date of Patent: Dec. 24, 2019

(54) INTERFERENCE MANAGEMENT FOR NETWORKS WITH VARIABLE TRANSMISSION TIME INTERVALS

(71) Applicant: QUALCOMM Incorporated, San Diego, CA (US)

(72) Inventors: Chong Li, Weehawken, NJ (US); Hua Wang, Basking Ridge, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 15/192,999

(22) Filed: Jun. 24, 2016

(65) Prior Publication Data

US 2017/0223720 A1    Aug. 3, 2017

Related U.S. Application Data

(60) Provisional application No. 62/290,411, filed on Feb. 2, 2016.

(51) Int. Cl.
| | |
|---|---|
| *H04W 72/10* | (2009.01) |
| *H04W 72/04* | (2009.01) |
| *H04W 52/02* | (2009.01) |
| *H04L 5/00* | (2006.01) |

(52) U.S. Cl.
CPC ............. *H04W 72/10* (2013.01); *H04L 5/003* (2013.01); *H04W 52/0216* (2013.01); *H04W 72/0446* (2013.01); *H04W 72/0453* (2013.01)

(58) Field of Classification Search
CPC ...... H04W 24/02–10; H04W 72/04–12; H04L 5/14–1496
See application file for complete search history.

(56) References Cited

U.S. PATENT DOCUMENTS

| | | | |
|---|---|---|---|
| 9,088,951 B2 | 7/2015 | Barrett et al. | |
| 2003/0179755 A1 | 9/2003 | Fraser | |
| 2014/0204861 A1* | 7/2014 | Tie .................. | H04W 52/24 370/329 |
| 2014/0369247 A1 | 12/2014 | Sambhwani et al. | |
| 2015/0063222 A1* | 3/2015 | Wang ................ | H04W 24/02 370/329 |

(Continued)

FOREIGN PATENT DOCUMENTS

| | | |
|---|---|---|
| WO | WO-2011130452 A2 | 10/2011 |
| WO | WO-2014179979 A1 | 11/2014 |

OTHER PUBLICATIONS

ISA/EP, International Search Report and Written Opinion of the International Searching Authority, Int'l Application No. PCT/US2017/014347, dated Apr. 12, 2017, European Patent Office, Rijswijk, NL, 14 pgs.

*Primary Examiner* — Marcus Smith

(74) *Attorney, Agent, or Firm* — Holland & Hart LLP; Clint R. Morin

(57) ABSTRACT

Methods, systems, and devices for wireless communication are described. A first cell may receive a message indicating that a second cell has a priority transmission scheduled using a transmit time interval (TTI) that is shorter than a TTI used by the first cell. The first cell may limit, based on the message, a communication parameter associated with communications between the first cell and a user equipment (UE) during the scheduled priority transmission.

39 Claims, 12 Drawing Sheets

(56) References Cited

U.S. PATENT DOCUMENTS

| | | |
|---|---|---|
| 2015/0188650 A1* | 7/2015 | Au .................... H04J 3/1694 |
| | | 370/312 |
| 2015/0215794 A1 | 7/2015 | Gormley et al. |
| 2015/0223135 A1* | 8/2015 | Ratasuk ............... H04W 16/32 |
| | | 455/436 |
| 2015/0289266 A1* | 10/2015 | Hsu .................. H04W 72/0446 |
| | | 370/329 |
| 2015/0312930 A1 | 10/2015 | Han et al. |
| 2015/0333898 A1 | 11/2015 | Ji et al. |
| 2015/0382254 A1 | 12/2015 | Pakniat et al. |

* cited by examiner

INTERFERENCE MANAGEMENT FOR NETWORKS WITH VARIABLE TRANSMISSION TIME INTERVALS

CROSS REFERENCES

The present application for patent claims priority to U.S. Provisional Patent Application No. 62/290,411 by Li et al., entitled "Interference Management for Networks with Variable Transmission Time Intervals," filed Feb. 2, 2016, assigned to the assignee hereof.

BACKGROUND

The following relates generally to wireless communication, and more specifically to interference management with variable transmission time intervals (TTIs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

Generally, the neighboring base stations (or "cells") are time aligned and share a common scheduling interval used for transmissions. This scheduling interval may be referred to as the transmit time interval (TTI) for the wireless communications system. The common TTI is conventionally known a priori by the cells and is used for encapsulation of data from higher layers into frames for transmission on the radio link layer, e.g., the duration of a transmission on the radio link layer. The TTI may determine the size of the data blocks. This common TTI-based block size helps establish, in some aspects, the latency of the wireless communication system, e.g., the round trip time for data communications within the system. While this common TTI size may be suitable in standard wireless communications, some communications may benefit from a shorter TTI length for reduced latency.

SUMMARY

The described techniques relate to improved methods, systems, or apparatuses that support interference management for wireless communications systems with variable TTIs. Generally, the described techniques provide for a cell to receive a message from a neighboring cell that indicates the neighboring cell has a priority transmission scheduled using a TTI that is different from the conventional wireless communication system TTI, e.g., a shorter TTI for high priority communications. The cell may limit its communications parameter based on the message for communications between the cell and a UE (or multiple UEs) within its coverage area. The cell may limit its communication parameters during the scheduled priority transmission of the neighboring cell and the limited communication parameters may mitigate or eliminate interference to the priority transmissions. In some examples, the cell may limit its communication parameters by muting its communications with the UE during the priority transmission, by performing a power backoff for transmissions to the UE, by only communicating with UEs that mitigate interference, by scheduling communications with UEs that mitigate interference, or all of the above. Thus, the cell may support the scheduled priority transmissions by performing actions to minimize or avoid interference.

A method of wireless communication is described. The method may include receiving, at a first cell, a message indicating that a second cell has a priority transmission scheduled using a first TTI, the first TTI shorter in duration than a TTI of the first cell and limiting, based at least in part on the message, a communication parameter associated with communications between the first cell and a UE during the scheduled priority transmission.

An apparatus for wireless communication is described. The apparatus may include means for receiving, at a first cell, a message indicating that a second cell has a priority transmission scheduled using a first TTI, the first TTI shorter in duration than a TTI of the first cell and means for limiting, based at least in part on the message, a communication parameter associated with communications between the first cell and a UE during the scheduled priority transmission.

A further apparatus is described. The apparatus may include a processor, memory in electronic communication with the processor, and instructions stored in the memory. The instructions may be operable to cause the processor to receive, at a first cell, a message indicating that a second cell has a priority transmission scheduled using a first TTI, the first TTI shorter in duration than a TTI of the first cell and limit, based at least in part on the message, a communication parameter associated with communications between the first cell and a UE during the scheduled priority transmission.

A non-transitory computer readable medium for wireless communication is described. The non-transitory computer-readable medium may include instructions to cause a processor to receive, at a first cell, a message indicating that a second cell has a priority transmission scheduled using a first TTI, the first TTI shorter in duration than a TTI of the first cell and limit, based on the message, a communication parameter associated with communications between the first cell and a UE during the scheduled priority transmission.

In some examples of the method, apparatus, or non-transitory computer-readable medium described above, the communications between the first cell and the UE are downlink (DL) communications. In some examples of the method, apparatus, or non-transitory computer-readable medium described above, limiting the communication parameter comprises: muting the communications with the UE during a gap time that is selected to align with the scheduled priority transmission.

In some examples of the method, apparatus, or non-transitory computer-readable medium described above, the gap time comprises a duration that is the same as the first TTI.

In some examples of the method, apparatus, or non-transitory computer-readable medium described above, the priority transmission comprises multiple priority transmissions using the first TTI during a single instance of the TTI of the first cell, and wherein the communications with the UE are muted during each of the multiple priority transmissions.

In some examples of the method, apparatus, or non-transitory computer-readable medium described above, limiting the communication parameter comprises: identifying, based on the communications with the UE being a DL communication, a power fallback parameter associated with the DL communications. Some examples of the method, apparatus, or non-transitory computer-readable medium described above may further include processes, features, means, or instructions for determining that the DL communications with the UE using the power fallback parameter will not interfere with the priority transmission. Some examples of the method, apparatus, or non-transitory computer-readable medium described above may further include processes, features, means, or instructions for communicating with the UE using the power fallback parameter and during a time selected to overlap with the priority transmission.

In some examples of the method, apparatus, or non-transitory computer-readable medium described above, limiting the communication parameter comprises: determining that communications with the UE cause interference with the priority transmission that is below an interference threshold. Some examples of the method, apparatus, or non-transitory computer-readable medium described above may further include processes, features, means, or instructions for scheduling the UE for communications during a time selected to overlap with the priority transmission using the first TTI based on the determining.

Some examples of the method, apparatus, or non-transitory computer-readable medium described above may further include processes, features, means, or instructions for determining that the interference caused by communications with the UE is below the interference threshold is based on at least one of a location of the UE within a coverage area of the first cell, an interference level of the communications with the UE being below a threshold value, converting a DL communication with the UE to an uplink (UL) communication with the UE, or combinations thereof.

In some examples of the method, apparatus, or non-transitory computer-readable medium described above, limiting the communication parameter comprises: determining that communications with the UE will interfere with the priority transmission. Some examples of the method, apparatus, or non-transitory computer-readable medium described above may further include processes, features, means, or instructions for refraining from scheduling the UE for communications during the priority transmission.

In some examples of the method, apparatus, or non-transitory computer-readable medium described above, the communications between the first cell and the UE are uplink communications. In some examples of the method, apparatus, or non-transitory computer-readable medium described above, limiting the communication parameter comprises: muting the communications with the UE during a gap time that is selected to align with the scheduled priority transmissions.

In some examples of the method, apparatus, or non-transitory computer-readable medium described above, limiting the communication parameter comprises: determining that communications with the UE and with at least one other UE will not interfere with the priority transmission. Some examples of the method, apparatus, or non-transitory computer-readable medium described above may further include processes, features, means, or instructions for scheduling the UE and the at least one other UE for communications using the TTI and according to a time division multiplexing (TDM) scheme. In some examples of the method, apparatus, or non-transitory computer-readable medium described above, the first cell is a one-hop adjacent cell of the second cell.

In some examples of the method, apparatus, or non-transitory computer-readable medium described above, the message comprises at least one of a priority transmission indicator field, an identification (ID) parameter of a priority UE associated with the priority transmission, a location parameter of the priority UE associated with the priority transmission, a timing parameter associated with the first TTI, or combinations thereof. In some examples of the method, apparatus, or non-transitory computer-readable medium described above, the message is received from the second cell via an X2 backhaul communications link.

DETAILED DESCRIPTION

The common transmit timer interval (TTI) used for wireless communication systems provides some stability and advantages for conventional communications. Other communications, however, may benefit from different TTI intervals. For example, communications with high reliability and low latency may support priority transmissions in areas such as factory automation, smarter meters in meter grids, remote surgery, emergency response operations, etc. These priority communications may refer to mission critical (MiCr) communications and may utilize shorter TTI intervals for the priority transmissions. In one non-limiting example, a MiCr cell may utilize a four symbol short TTI for uplink and/or downlink communications. Neighboring cells may, however, have communications scheduled using the conventional TTI which may cause interference for the priority transmissions. Thus, interference management may be helpful in the neighboring cells (e.g., the non-MiCr cells) to support the priority transmissions in the MiCr cells.

Aspects of the disclosure are initially described in the context of a wireless communication system. The described techniques relate to improved systems, methods, and/or apparatuses for interference mitigation in a system that supports flexible TTIs. A cell may receive a message from a neighboring cell (e.g., a MiCr cell) conveying an indication that the neighboring cell has a priority transmission scheduled. The message may be received via a backhaul link, e.g., an X2 backhaul link, in some examples. The message may include, in some aspects, information identifying timing, location, and/or other aspects associated with the scheduled priority transmission. The priority transmission may be scheduled using a different TTI than the TTI used by the cell, e.g., using a shorter TTI for the priority transmission. The cell may limit aspects of its communication parameters between the cell and UE(s) located within its coverage area. Generally, the limited communication parameter may eliminate or mitigate interference with the priority transmission. For example, the cell may mute its communications, perform power fallback procedures, implement smart scheduling for its communications, etc., to avoid interfering with the priority transmission. Aspects of the disclosure are further illustrated by and described with reference to apparatus diagrams, system diagrams, and flowcharts that relate to interference management with variable TTIs.

Figure 1:
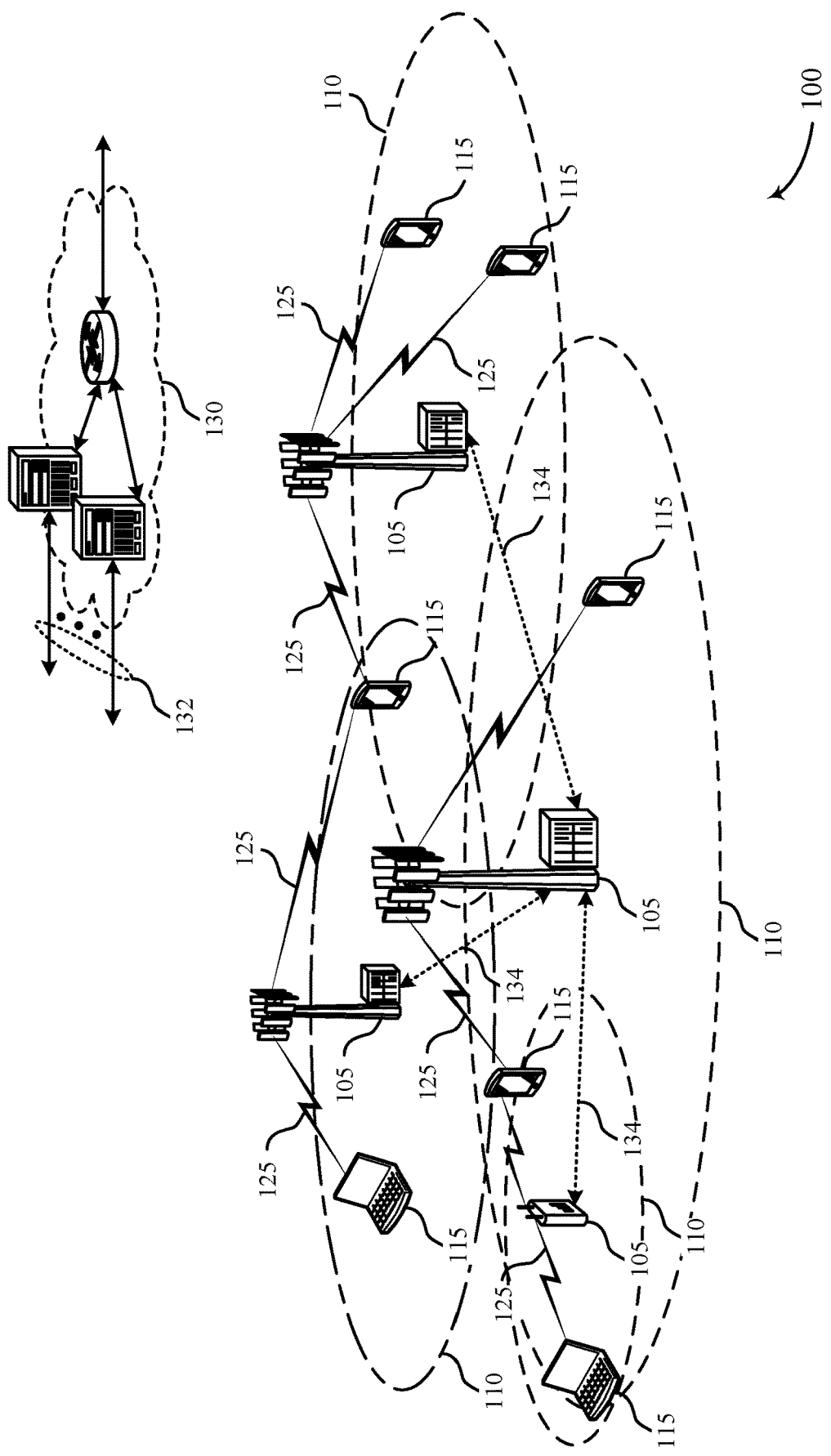
FIG. 1 illustrates an example of a wireless communications system that supports interference management with variable TTIs in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A frame structure may be used to organize physical resources in wireless communications system 100. A frame may be a 10 ms interval that may be further divided into 10 equally sized sub-frames. Each sub-frame may include two consecutive time slots. Each slot may include 6 or 7 OFDMA symbol periods. A resource element (RE) includes one symbol period and one subcarrier (a 15 KHz frequency range). A resource block (RB) may contain 12 consecutive subcarriers in the frequency domain and, for a normal cyclic prefix (CP) in each OFDM symbol, 7 consecutive OFDM symbols in the time domain (1 slot), or 84 REs.

Time intervals in LTE may be expressed in multiples of a basic time unit (e.g., the sampling period, Ts=1/30,720,000 seconds). Time resources may be organized according to radio frames of length of 10 ms (Tf=307200 Ts), which may be identified by an system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the CP prepended to each symbol). Excluding the CP, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers (CCs) using short TTIs). In other cases, a base station 105 (also referred to as a cell) may use a standard TTI for conventional communications and a shorter TTI for priority transmissions, e.g., MiCr communications. In one non-limiting example, conventional communications, e.g., a non-MiCr communication, the wireless communications system 100 may use a 500 ms frame structure having an OFDM symbol of ~32 us time duration. A self-contained frame may use 16 such symbols.

The base stations 105 (or cells) may support inter-cell interference mitigation techniques when a flexible TTI is used by a neighboring cell according to aspects of the present disclosure. For example, a neighboring cell (MiCr cell) may have a priority transmission scheduled that uses a short TTI, e.g., uses a four-symbol short TTI for uplink and/or downlink priority transmissions. The MiCr cell may send a message to its adjacent cells, e.g., one-hop adjacent cells, indicating that it has a priority transmission scheduled using a short TTI. The adjacent cell receives the message and limits its communication parameters for communications with UEs 115 within its coverage area. The limited communication parameter may include muting communications, employing power backoff procedures for the communications, utilizing smart scheduling for the communications, or combinations of such techniques. Thus, the non-MiCr cell may modify, adjust, or otherwise limit its communication parameters to reduce or eliminate interference with the priority transmission of the MiCr cell.

Figure 2:
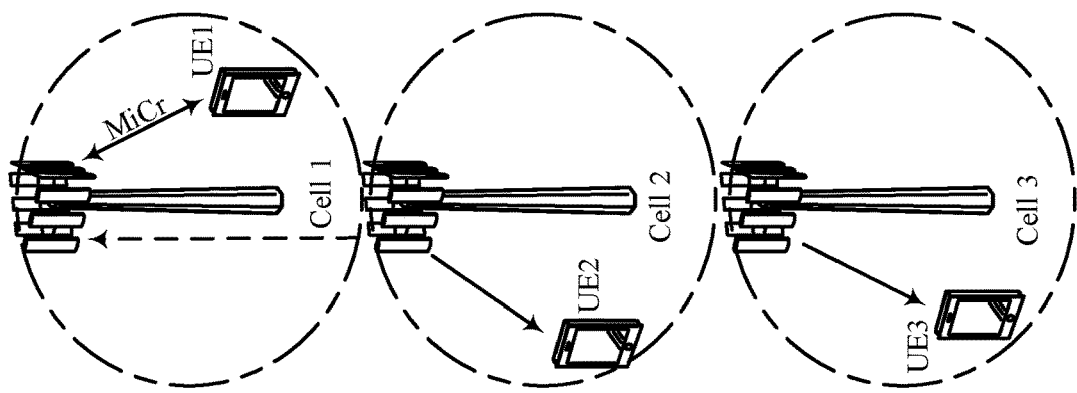
FIG. 2 illustrates an example of aspects of a wireless communications system that supports interference management with variable TTIs in accordance with aspects of the present disclosure.
Figure 2:
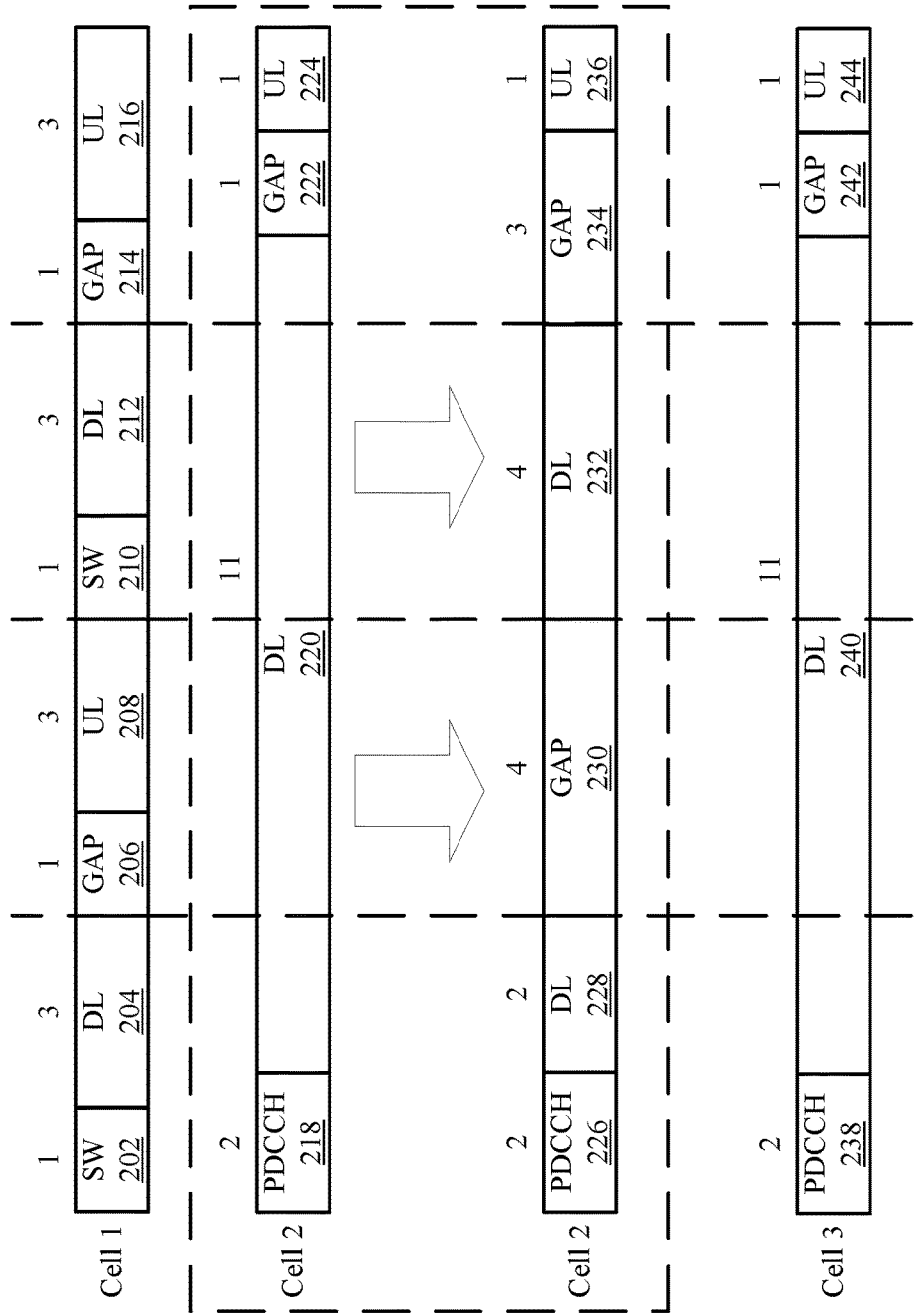

FIG. 2 illustrates various aspects of an example of a wireless communications system 200 for interference management with variable TTIs. Wireless communications system 200 may include cell 1 that communicates with UE 1, cell 2 that communicates with UE 2, and cell 3 that communicates with UE 3. Cells 1-3 and/or UEs 1-3 may be examples of the cells/base station 105 and the UEs 115, respectively, described with reference to FIG. 1. The cells 1-3 and UEs 1-3 of wireless communications system 200 may be time synchronized. Generally, the wireless communications system 200 supports the described interference mitigation techniques when cell 1 has a priority transmission scheduled with UE 1 that uses a short TTI.

Conventionally, wireless communications system 200 may use a self-contained frame structure having 16 symbols. The cells 1-3 may typically communicate with UEs 1-3, respectively, using a TTI comprising 16 symbols. In the example timing features illustrated in FIG. 2, cells 1-3 may be initially configured for downlink communications using the conventional 16-symbol TTI. By way of example and with reference to the timing diagrams for cells 2 and 3. Cell 2 may have been scheduled for downlink communications with UE 2 during a 16 symbol TTI. The 16 symbol TTI may include a physical downlink control channel (PDCCH) 218 that is two symbols long, downlink communications 220 that is 11 symbols long, a gap 222 that is one symbol long and allows the UE 2 to retune for uplink communications, and then uplink communications 224 that is one symbol long. Similarly, cell 3 may have been scheduled for downlink communications with UE 3 during a 16 symbol TTI that includes a PDCCH 238 that is two symbols long, downlink communications 240 that is 11 symbols long, gap 242 that is one symbol long, and uplink communications 244 that is one symbol long.

Cell 1, however, may determine that it has a priority transmission (e.g., MiCr communication) to schedule with UE 1. The priority transmission may include uplink communications that may use a shorter TTI than the 16 symbol TTI used for conventional communications. In the example illustrated in FIG. 2, the cell 1 may use a TTI that is four symbols long. Thus, cell 1 may schedule the priority transmission that includes a switching symbol 202 that is one symbol long, a downlink communication 204 that is three symbols long, a gap 206 that is one symbol long, an uplink communication 208 that is three symbols long, a second switching symbol 210 that is one symbol long, a downlink communication 212 that is three symbols long, a gap 214 that is one symbol long, and finally an uplink communication 216 that is three symbols long. The switching symbols 202 and 210 as well as the gaps 206 and 214 may provide time for the cell 1 and/or UE 1 to retune from downlink-to-uplink communications, or vice versa. For example, the switching symbols 202 and 210 as well as the gaps 206 and 214 may provide a period to capture a radio frequency (RF) switching time, a channel propagation delay, a base-band signal processing period, and the like. The priority transmission may include, in some aspects, the gap 206 and uplink communication 208 that occupies a four symbol TTI. Other shortened TTI durations may also be considered in accordance with the present disclosure.

The downlink communication 220 scheduled between cell 2 and UE 2, however, may generate interference (shown as a dashed line) for the priority transmission between cell 1 and UE 1. However, the wireless communications system 200 supports inter-cell interference mitigation according to aspects of the described techniques. Thus, cell 1 may transmit a message to cell 2 indicating that it has a priority transmission scheduled that uses a shorter TTI. The message may be transmitted via a backhaul link, such as backhaul links 134 described with reference to FIG. 1. The message may include various information associated with the priority transmission. For example, the message may convey a flag or field that indicates that cell 1 has a priority transmission scheduled. Cell 2 may know, a priori, to mitigate interference based on the presence of the flag, based on the location of the flag within the message, based on the timing of the message, etc. Cell 2 may also know, a priori, that the priority transmission is using a shorter TTI and know the length of the short TTI based on the flag. Cell 2 may know this information based on a look-up table, based on manufacturer configuration, etc.

In another example, the message may include a timing component that conveys an indication of when the priority transmission is scheduled, how long the TTI duration is, how many priority transmissions are scheduled during a conventional TTI, etc. In another example, the message may include a position component that conveys an indication of the identity and/or location of UE 1, e.g., the UE that cell 1 has a priority transmission scheduled with.

Cell 2 may receive the message and limit aspects of its communication parameters for communications between cell 2 and UE 2. Cell 2 may limit its communication parameters during the scheduled priority transmission between cell 1 and UE 1 and based on the message received from cell 1. In the example shown in FIG. 2, cell 2 may mute its communications with UE 2 during the scheduled priority transmission. For example, instead of the PDCCH 218, downlink communication 220, etc., cell 2 may reschedule its communications with UE 2. The rescheduled communications may include a PDCCH 226 that is 2 symbols long, a downlink communications 228 that is two symbols long, a gap 230 that is four symbols long, a downlink communication 232 that is four symbols long, a gap 234 that is three symbols long, and an uplink communication 236 that is one symbol long. The gap 230 may be time aligned with the priority transmission of cells (e.g., with gap 206 and uplink communications 208) and may be four symbols long to correspond to the priority transmission, i.e., the gap 230 may have the same duration as the priority transmission. Therefore, cell 2 may continue to use the conventional 16-symbol TTI of the wireless communications system 200 and mute communications during the four symbols corresponding to the priority transmission to avoid causing interference. In the instance where cell 1 has multiple priority transmissions with short TTIs during a conventional TTI, cell 2 may mute its communications with UE 2 during each occurrence of the priority transmission.

With respect to cell 3, it is noted that cell 2 may be a one-hop adjacent cell with respect to cell 1. For example, cell 2 may have a coverage area that is next to or overlaps with the coverage area of cell 1. This proximity may, in some aspects, contribute to the interference to the priority transmission using the conventional TTI scheduling (e.g., without cell 2 rescheduling its communications). Cell 3, however, may be considered a two-hop adjacent cell in that while being located near cell 1, communications between cell 3 and UE 3 do not generate interference for the priority transmission of cell 1. Therefore, cell 3 may not need to reschedule its communications with UE 3 and may, instead, continue to use the conventional 16-symbol TTI duration for downlink communications with UE 3.

Figure 3:
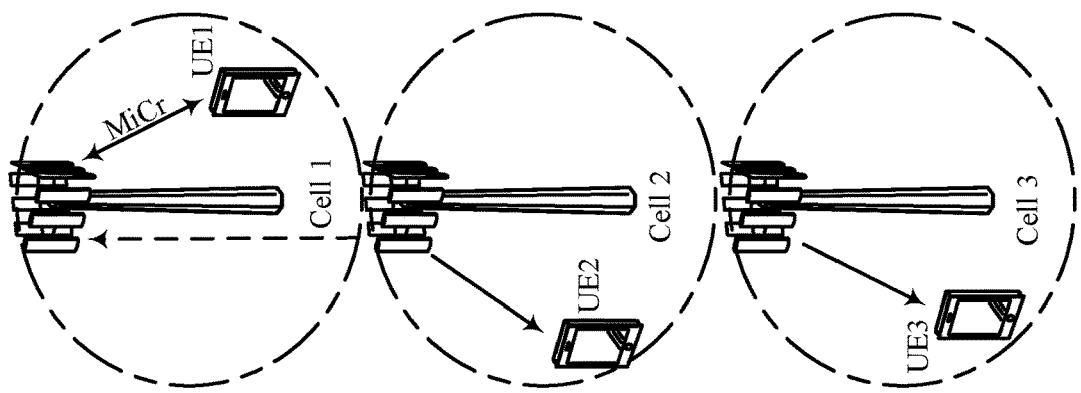
FIG. 3 illustrates another example of aspects of a wireless communications system that supports interference management with variable TTIs in accordance with aspects of the present disclosure.
Figure 3:
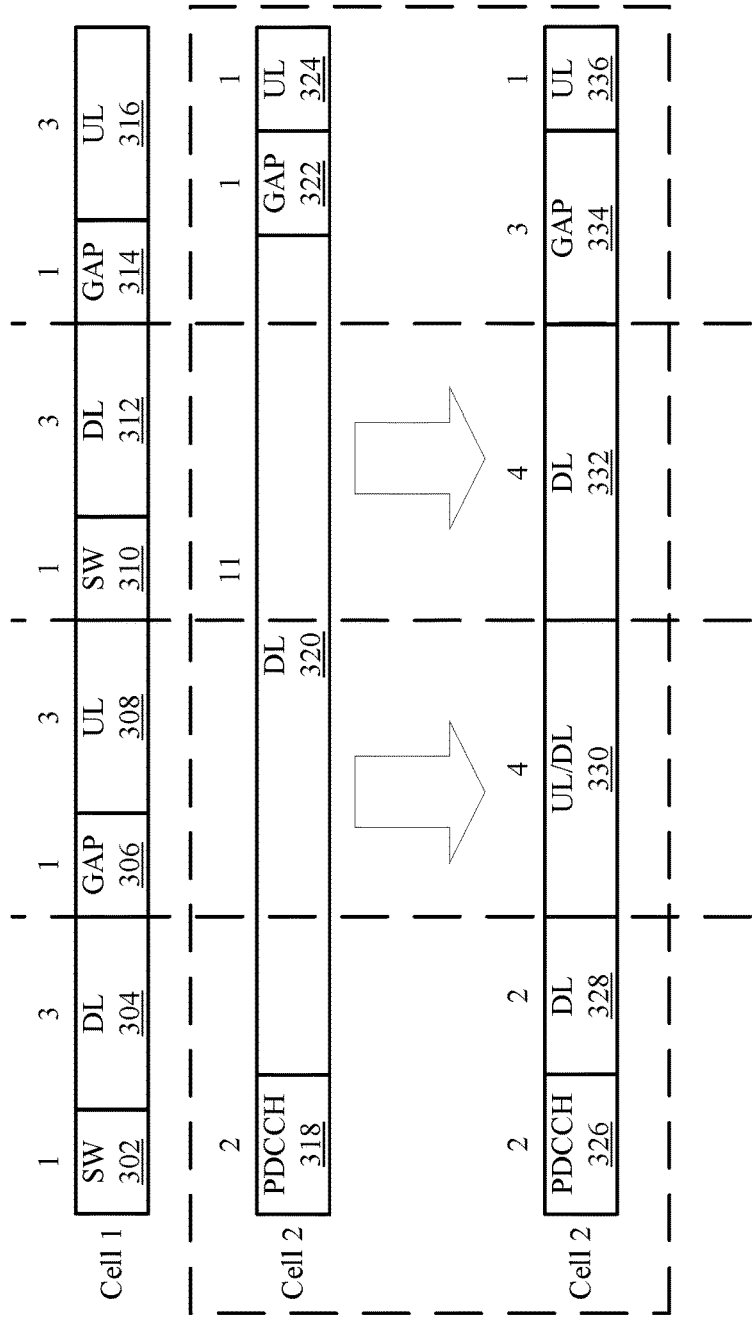

FIG. 3 illustrates various aspects of another example of a wireless communications system 300 for interference management with variable TTIs. Wireless communications system 300 may include cell 1 that communicates with UE 1, cell 2 that communicates with UE 2, and cell 3 that communicates with UE 3. Cells 1-3 and/or UEs 1-3 may be examples of the cells/base station 105 and the UEs 115, respectively, described with reference to FIG. 1. Cells 1-3 and/or UEs 1-3 may be examples of the cells 1-3 and UEs 1-3, respectively, described with reference to FIG. 2. The cells 1-3 and UEs 1-3 of wireless communications system 300 may be time synchronized. Generally, the wireless communications system 300 supports the described interference mitigation techniques when cell 1 has a priority transmission scheduled with UE 1 that uses a short TTI.

Conventionally, wireless communications system 300 may use a self-contained frame structure having 16 symbols. The cells 1-3 may typically communicate with UEs 1-3, respectively, using a TTI comprising 16 symbols. In the example timing features illustrated in FIG. 3, cells 1-3 may be initially configured for downlink communications using the conventional 16-symbol TTI. By way of example and with reference to the timing diagrams for cell 2. Cell 2 may have been scheduled for downlink communications with UE 2 during a 16 symbol TTI. The 16 symbol TTI may include a PDCCH 318 that is two symbols long, downlink communications 320 that is 11 symbols long, a gap 322 that is one symbol long and allows the UE 2 to retune for uplink communications, and then uplink communications 324 that is one symbol long. Although not shown, cell 3 may have been scheduled for downlink communications with UE 3 during the conventional 16-symbol TTI.

Cell 1, however, may determine that it has a priority transmission (e.g., MiCr communication) to schedule with UE 1. The priority transmission may include uplink communications that may use a shorter TTI than the 16 symbol TTI used for conventional communications. In the example illustrated in FIG. 3, cell 1 may use a TTI that is four symbols long. Thus, cell 1 may schedule the priority transmission that includes a switching symbol 302 that is one symbol long, a downlink communication 304 that is three symbols long, a gap 306 that is one symbol long, an uplink communication 308 that is three symbols long, a second switching symbol 310 that is one symbol long, a downlink communication 312 that is three symbols long, a gap 314 that is one symbol long, and finally an uplink communication 316 that is three symbols long. The priority transmission may include, in some aspects, the gap 306 and uplink communication 308 that occupies a four symbol TTI. Other shortened TTI durations may also be considered in accordance with the present disclosure.

The downlink communication 320 scheduled between cell 2 and UE 2, however, may generate interference (shown as a dashed line) for the priority transmission between cell 1 and UE 1. However, the wireless communications system 300 supports inter-cell interference mitigation according to aspects of the described techniques. Thus, cell 1 may transmit a message to cell 2 indicating that it has a priority transmission scheduled that uses a shorter TTI. The message may be transmitted via a backhaul link, such as backhaul links 134 described with reference to FIG. 1. The message may include various information associated with the priority transmission, such as a flag or field that indicates that cell 1 has a priority transmission scheduled, a timing component, and/or a position component, as is described with reference to FIG. 2.

Cell 2 may receive the message and limit aspects of its communication parameters for communications between cell 2 and UE 2. Cell 2 may limit its communication parameters during the scheduled priority transmission between cell 1 and UE 1 and based on the message received from cell 1. In the example shown in FIG. 3, cell 2 may perform intelligent scheduling for its communications with UE 2 during the scheduled priority transmission. For example, instead of the PDCCH 318, downlink communication 320, etc., cell 2 may reschedule its communications with UE 2. The rescheduled communications may include a PDCCH 326 that is 2 symbols long, a downlink communications 328 that is two symbols long, an uplink/downlink communications 330 that is four symbols long, a downlink communication 332 that is four symbols long, a gap 334 that is three symbols long, and an uplink communication 336 that is one symbol long. The uplink/downlink communications 330 may be time aligned with the priority transmission of cell 1 (e.g., with gap 306 and uplink communications 308) and may be four symbols long to correspond to the priority transmission, i.e., may have the same duration as the priority transmission.

In some examples, the uplink/downlink communications 330 may be based on cell 2 identifying a power fallback parameter associated with the downlink communications with UE 2. The power fallback parameter may include the cell 2 reducing the transmit power for the downlink communications with UE 2 to mitigate interfering with the priority transmission. For example, cell 2 may, based on the message from cell 1, determine that the reduced transmit power will not interfere with the priority transmission.

In another example, the uplink/downlink communications 330 may be based on cell 2 scheduling UE 2 for uplink communications during the priority transmission. For example, the uplink communications may be scheduled with a UE that is close to cell 2 and therefore may utilize a lower transmit power. In some aspects, cell 2 may determine whether uplink communications would cause interference above a threshold, e.g., based on the location of UE 1, based on a monitored interference level, etc. When the determined interference is below the threshold, cell 2 may schedule UE(s) for uplink communications during uplink/downlink communications 330.

In another example, the uplink/downlink communications 330 may be based on cell 2 scheduling UE 2 and other UEs for uplink communications according to a time division multiplexing (TDM) scheme. The TDM scheme may limit the uplink communications to one UE at a time to reduce or avoid interference with the priority transmission.

Although not shown in FIG. 3, cell 3, however, may be considered a two-hop adjacent cell in that while being located near cell 1. Therefore, communications between cell 3 and UE 3 may not generate interference for the priority transmission and cell 3 may not need to reschedule its communications with UE 3.

Figure 4:
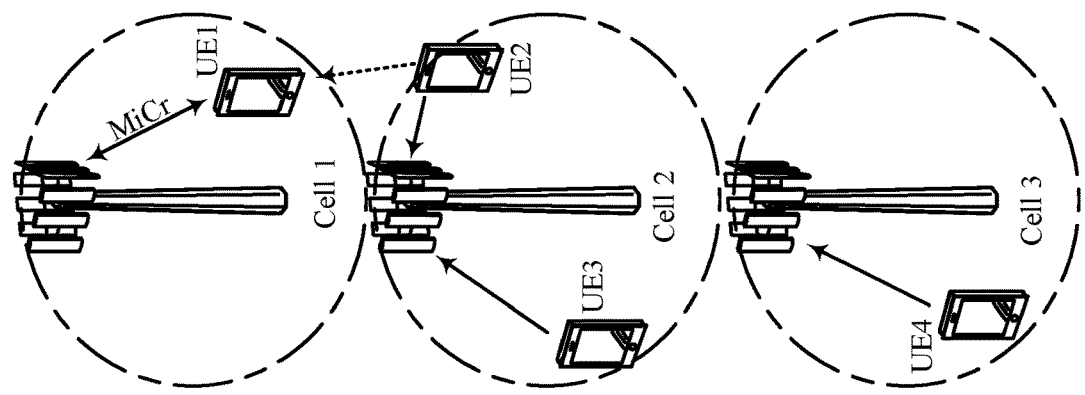
FIG. 4 illustrates another example of aspects of a wireless communications system that supports interference management with variable TTIs in accordance with aspects of the present disclosure.
Figure 4:
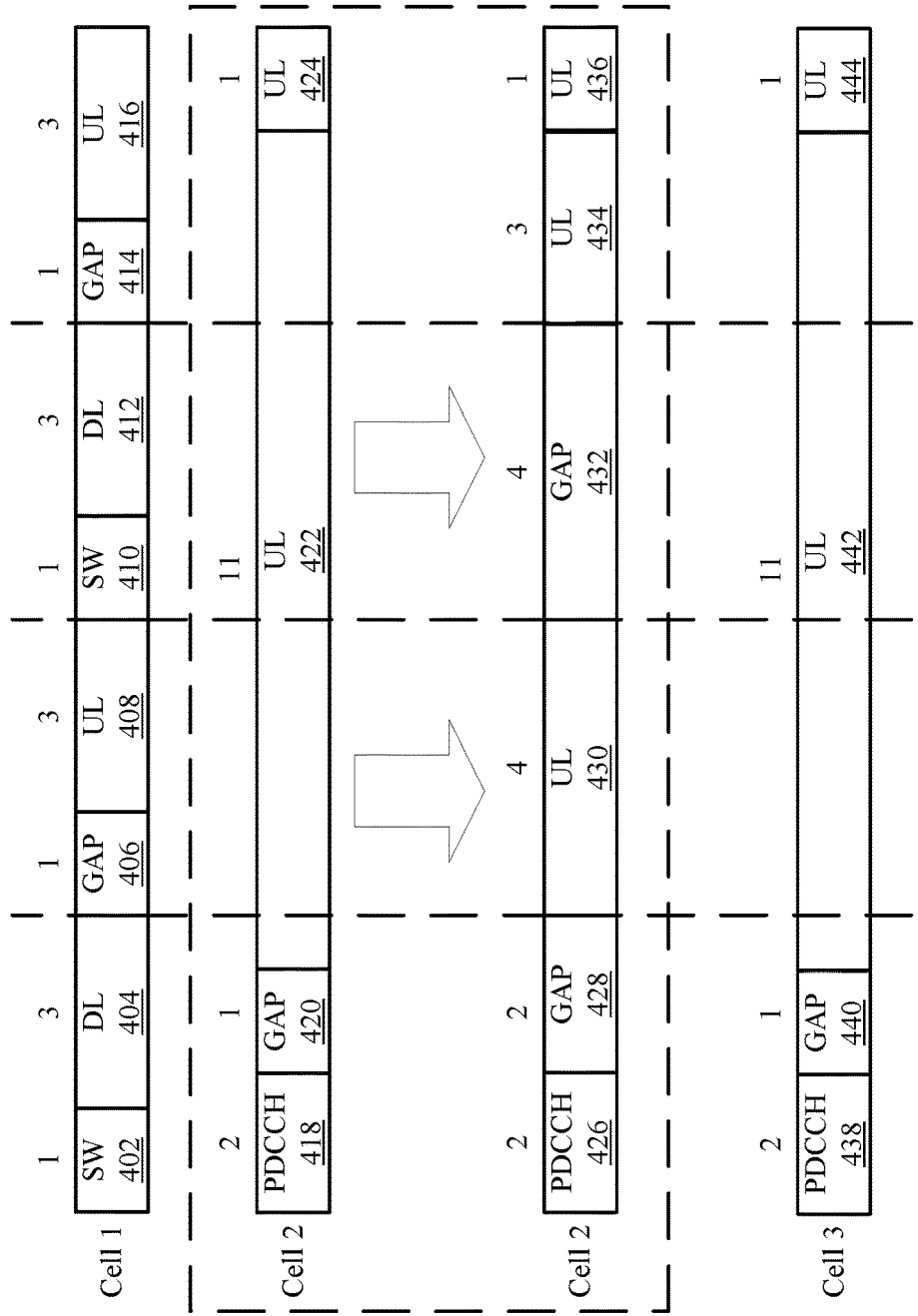

FIG. 4 illustrates various aspects of another example of a wireless communications system 400 for interference management with variable TTIs. Wireless communications system 400 may include cell 1 that communicates with UE 1, cell 2 that communicates with UEs 2 and 3, and cell 3 that communicates with UE 4. Cells 1-3 and/or UEs 1-4 may be examples of the cells/base station 105 and the UEs 115, respectively, described with reference to FIG. 1. Cells 1-3 and/or UEs 1-4 may be examples of the cells 1-3 and UEs 1-3 of FIGS. 2 and/or 3. The cells 1-3 and UEs 1-4 of wireless communications system 400 may be time synchronized. Generally, the wireless communications system 400 supports the described interference mitigation techniques when cell 1 has a priority transmission scheduled with UE 1 that uses a short TTI.

Conventionally, wireless communications system 400 may use a self-contained frame structure having 16 symbols. The cells 1-3 may typically communicate with UEs 1-4, respectively, using a TTI comprising 16 symbols. In the example timing features illustrated in FIG. 4, cells 1-3 may be initially configured for uplink communications using the conventional 16-symbol TTI. By way of example and with reference to the timing diagrams for cells 2 and 3, cell 2 may have been scheduled for uplink communications with UE 2 and/or UE 3 during a 16 symbol TTI. The 16 symbol TTI may include a PDCCH 418 that is two symbols long, a gap 420 that is one symbol long, uplink communications 422 that is 11 symbols long, and uplink communications 424 that is one symbol long. Similarly, cell 3 may have been scheduled for uplink communications with UE 4 during a 16 symbol TTI that includes a PDCCH 438 that is two symbols long, a gap 440 that is one symbol long, uplink communications 442 that is 11 symbols long, and uplink communications 444 that is one symbol long.

Cell 1, however, may determine that it has a priority transmission (e.g., MiCr communication) to schedule with UE 1. The priority transmission may include downlink communications that may use a shorter TTI than the 16 symbol TTI used for conventional communications. In the example illustrated in FIG. 4, the cell 1 may use a TTI that is four symbols long for the priority transmission. Thus, cell 1 may schedule the priority transmission that includes a switching symbol 402 that is one symbol long, a downlink communication 404 that is three symbols long, a gap 406 that is one symbol long, an uplink communication 408 that is three symbols long, a second switching symbol 410 that is one symbol long, a downlink communication 412 that is three symbols long, a gap 414 that is one symbol long, and an uplink communication 416 that is three symbols long. The switching symbols 402 and 410 as well as the gaps 406 and 414 may provide time for the cell 1 and/or UE 1 to retune from downlink-to-uplink communications, or vice versa. The priority transmission may include, in some aspects, the second switching symbol 410 and the downlink communication 412 that occupies a four symbol TTI. Other shortened TTI durations may also be considered in accordance with the present disclosure.

The uplink communication 422 scheduled between cell 2 and UE 2, however, may generate interference (shown as a dashed line) for the priority transmission between cell 1 and UE 1. However, the wireless communications system 400 supports inter-cell interference mitigation according to aspects of the described techniques. Thus, cell 1 may transmit a message to cell 2 indicating that it has a priority transmission scheduled that uses a shorter TTI. The message may be transmitted via a backhaul link, such as backhaul links 134 described with reference to FIG. 1. The message may include various information associated with the priority transmission. For example, the message may convey a flag or field that indicates that cell 1 has a priority transmission scheduled, may include a timing component, may include a position component, etc.

Cell 2 may receive the message and limit aspects of its communication parameters for communications between cell 2 and UEs 2 and/or 3. Cell 2 may limit its communication parameters during the scheduled priority transmission between cell 1 and UE 1 and based on the message received from cell 1. In the example shown in FIG. 4, cell 2 may mute its communications with UEs 2 and/or 3 during the scheduled priority transmission. For example, instead of the PDCCH 418, uplink communication 422, etc., cell 2 may reschedule its communications with UEs 2 and/or 3. The rescheduled communications may include a PDCCH 426 that is 2 symbols long, a gap 428 that is two symbols long, an uplink communications 430 that is four symbols long, a gap 432 that is four symbols long, an uplink communication 434 that is three symbols long, and an uplink communication 436 that is one symbol long. The gap 432 may be time aligned with the priority transmission of cell 1 (e.g., with the second switching symbol 410 and downlink communication 412) and may be four symbols long to correspond to the priority transmission, i.e., the gap 432 may have the same duration as the priority transmission. Therefore, cell 2 may continue to use the conventional 16-symbol TTI of the wireless communications system 400 and mute communications during the four symbols corresponding to the priority transmission to avoid causing interference. In the instance where cell 1 has multiple priority transmissions with short TTIs during a conventional TTI, cell 2 may mute its communications with UEs 2 and/or 3 during each occurrence of the priority transmission.

With respect to cell 3, it is noted that cell 2 may be a one-hop adjacent cell with respect to cell 1. For example, cell 2 may have a coverage area that is next to or overlaps with the coverage area of cell 1. This proximity may, in some aspects, contribute to the interference to the priority transmission using the conventional TTI scheduling (e.g., without cell 2 rescheduling its communications). Cell 3, however, may be considered a two-hop adjacent cell in that while being located near cell 1, communications between cell 3 and UE 4 do not generate interference for the priority transmission of cell 1. Therefore, cell 3 may not need to reschedule its communications with UE 4 and may, instead, continue to use the conventional 16-symbol TTI duration for uplink communications with UE 4.

Figure 5:
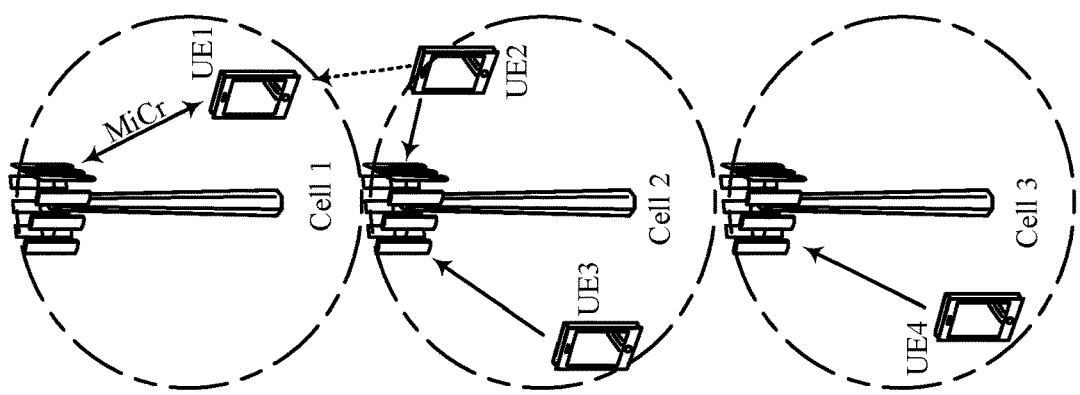
FIG. 5 illustrates another example of aspects of a wireless communications system that supports interference management with variable TTIs in accordance with aspects of the present disclosure.
Figure 5:
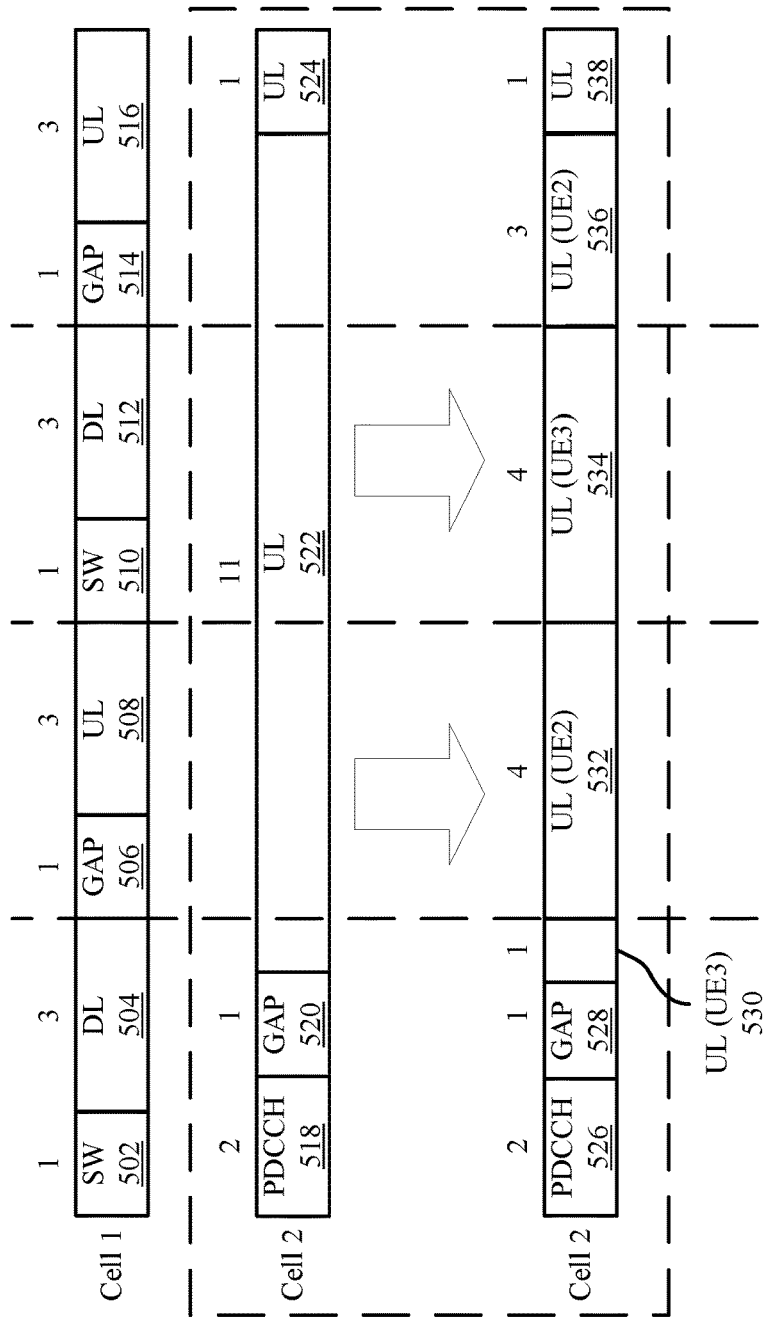

FIG. 5 illustrates various aspects of another example of a wireless communications system 500 for interference management with variable TTIs. Wireless communications system 500 may include cell 1 that communicates with UE 1, cell 2 that communicates with UEs 2 and 3, and cell 3 that communicates with UE 4. Cells 1-3 and/or UEs 1-4 may be examples of the cells/base station 105 and the UEs 115, respectively, described with reference to FIG. 1. Cells 1-3 and/or UEs 1-4 may be examples of the cells 1-3 and UEs 1-4 of FIGS. 2-4. The cells 1-3 and UEs 1-4 of wireless communications system 500 may be time synchronized. Generally, the wireless communications system 500 supports the described interference mitigation techniques when cell 1 has a priority transmission scheduled with UE 1 that uses a short TTI.

Conventionally, wireless communications system 500 may use a self-contained frame structure having 16 symbols. The cells 1-3 may typically communicate with UEs 1-4, respectively, using a TTI comprising 16 symbols. In the example timing features illustrated in FIG. 4, cells 1-3 may be initially configured for uplink communications using the conventional 16-symbol TTI. By way of example and with reference to the timing diagrams for cell 2, cell 2 may have been scheduled for uplink communications with UE 2 and/or UE 3 during a 16 symbol TTI. The 16 symbol TTI may include a PDCCH 518 that is two symbols long, a gap 520 that is one symbol long, uplink communications 522 that is 11 symbols long, and uplink communications 524 that is one symbol long.

Cell 1, however, may determine that it has a priority transmission (e.g., MiCr communication) to schedule with UE 1. The priority transmission may include downlink communications that may use a shorter TTI than the 16 symbol TTI used for conventional communications. In the example illustrated in FIG. 5, the cell 1 may use a TTI that is four symbols long for the priority transmission. Thus, cell 1 may schedule the priority transmission that includes a switching symbol 502 that is one symbol long, a downlink communication 504 that is three symbols long, a gap 506 that is one symbol long, an uplink communication 508 that is three symbols long, a second switching symbol 510 that is one symbol long, a downlink communication 512 that is three symbols long, a gap 514 that is one symbol long, and an uplink communication 516 that is three symbols long. The priority transmission may include, in some aspects, the second switching symbol 510 and the downlink communication 512 that occupies a four symbol TTI. Other shortened TTI durations may also be considered in accordance with the present disclosure.

The uplink communication 522 scheduled between cell 2 and UE 2, however, may generate interference (shown as a dashed line) for the priority transmission between cell 1 and UE 1. However, the wireless communications system 500 supports inter-cell interference mitigation according to aspects of the described techniques. Thus, cell 1 may transmit a message to cell 2 indicating that it has a priority transmission scheduled that uses a shorter TTI. The message may be transmitted via a backhaul link, such as backhaul links 134 described with reference to FIG. 1. The message may include various information associated with the priority transmission. For example, the message may convey a flag or field that indicates that cell 1 has a priority transmission scheduled, may include a timing component, may include a position component, etc.

Cell 2 may receive the message and limit aspects of its communication parameters for communications between cell 2 and UEs 2 and/or 3. Cell 2 may limit its communication parameters during the scheduled priority transmission between cell 1 and UE 1 and based on the message received from cell 1. In the example shown in FIG. 5, cell 2 may limit its communication parameter by scheduling uplink communications with UEs 2 and/or 3 using a TDM scheme. For example, instead of the PDCCH 518, uplink communication 522, etc., cell 2 may reschedule its communications with UEs 2 and/or 3. The rescheduled communications may include a PDCCH 526 that is 2 symbols long, a gap 528 that is one symbol long, an uplink communications 530 to UE 3 that is one symbol long, an uplink communication 532 to UE 2 that is four symbols long, an uplink communications 534 to UE 3 that is four symbols long, an uplink communication 536 to UE 2 that is three symbols long, and an uplink communication 538 that is one symbol long. Cell 2 may select UE 3 for uplink communications 534 that correspond to the priority transmission based on the location of UE 3 within the coverage area of cell 2. As shown, UE 3 may be located on an farther from the coverage area of cell 1 than UE 2 and therefore uplink communications with UE 3 may not generate interference with the priority transmission. The uplink communications 534 may be time aligned with the priority transmission of cell 1 (e.g., with the second switching symbol 510 and downlink communication 512) and may be four symbols long to correspond to the priority transmission. Therefore, cell 2 may continue to use the conventional 16-symbol TTI of wireless communications system 500 and schedule non-interfering uplink communications during the four symbols corresponding to the priority transmission to avoid causing interference.

Although not shown in FIG. 5, cell 3 may be considered a two-hop adjacent cell and therefore may not need to reschedule its communications with UE 4 and may, instead, continue to use the conventional 16-symbol TTI duration for uplink communications with UE 4.

Figure 6:
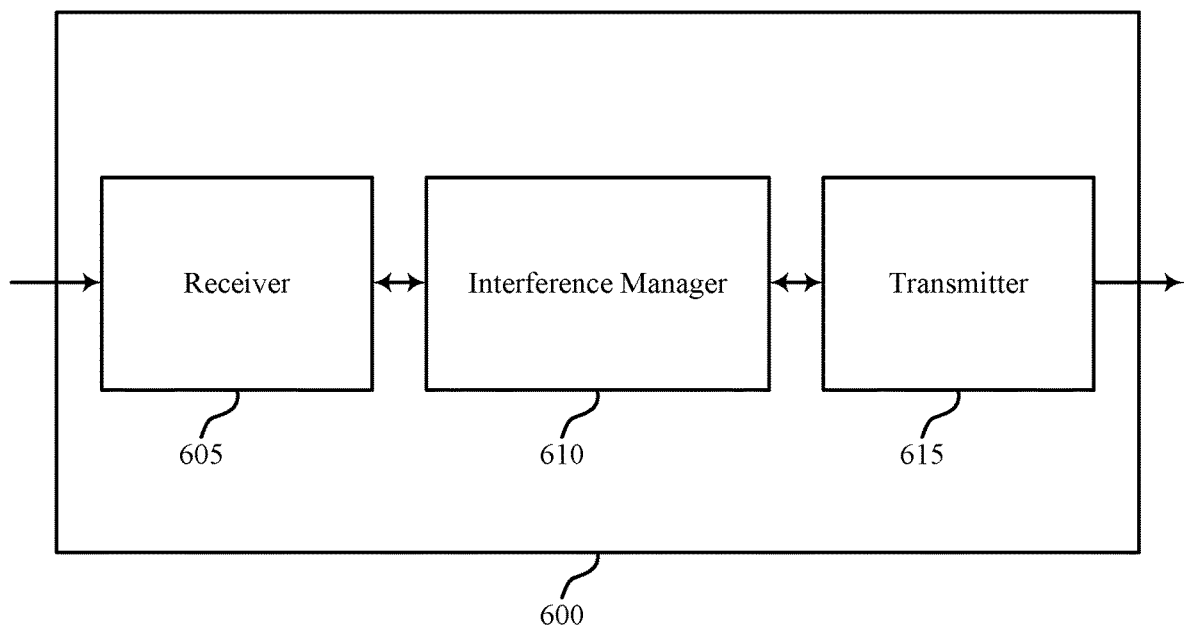
FIGS. 6 through 8 show block diagrams of a wireless device that supports interference management with variable TTIs in accordance with aspects of the present disclosure.

FIG. 6 shows a block diagram of a wireless device 600 that supports interference management with variable TTIs in accordance with various aspects of the present disclosure. Wireless device 600 may be an example of aspects of a base station 105 described with reference to FIG. 1. Wireless device 600 may be an example of aspects of cell 2 described with reference to FIGS. 2-5. Wireless device 600 may include receiver 605, interference manager 610 and transmitter 615. Wireless device 600 may also include a processor. Each of these components may be in communication with each other.

The receiver 605 may receive information such as packets, user data, or control information associated with various information channels (e.g., control channels, data channels, and information related to interference management with variable TTIs, etc.). Information may be passed on to other components of the device. The receiver 605 may be an example of aspects of the transceiver 925 described with reference to FIG. 9.

The interference manager 610 may receive, at a first cell, a message indicating that a second cell has a priority transmission scheduled using a first TTI, the first TTI shorter in duration than a TTI of the first cell, and limit, based on the message, a communication parameter associated with communications between the first cell and a UE during the scheduled priority transmission. The interference manager 610 may also be an example of aspects of the interference manager 905 described with reference to FIG. 9.

The transmitter 615 may transmit signals received from other components of wireless device 600. In some examples, the transmitter 615 may be collocated with a receiver in a transceiver module. For example, the transmitter 615 may be an example of aspects of the transceiver 925 described with reference to FIG. 9. The transmitter 615 may include a single antenna, or it may include a plurality of antennas.

Figure 7:
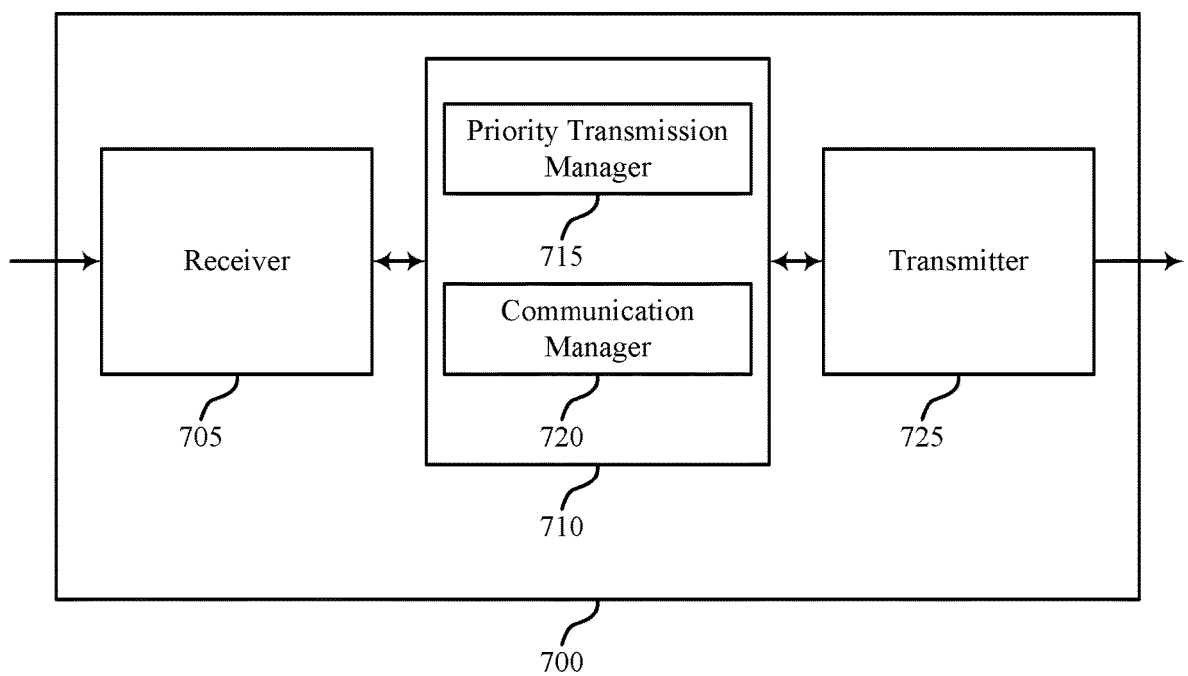

FIG. 7 shows a block diagram of a wireless device 700 that supports interference management with variable TTIs in accordance with various aspects of the present disclosure. Wireless device 700 may be an example of aspects of a wireless device 600, a base station 105 described with reference to FIG. 1, and/or an example of cell 2 described with reference to FIGS. 2-5. Wireless device 700 may include receiver 705, interference manager 710 and transmitter 725. Wireless device 700 may also include a processor. Each of these components may be in communication with each other.

The receiver 705 may receive information which may be passed on to other components of the device. The receiver 705 may also perform the functions described with reference to the receiver 605 of FIG. 6. The receiver 705 may be an example of aspects of the transceiver 925 described with reference to FIG. 9.

The interference manager 710 may be an example of aspects of interference manager 610 described with reference to FIG. 6. The interference manager 710 may include priority transmission manager 715 and communication manager 720. The interference manager 710 may be an example of aspects of the interference manager 905 described with reference to FIG. 9.

The priority transmission manager 715 may receive, at a first cell, a message indicating that a second cell has a priority transmission scheduled using a first TTI, the first TTI shorter in duration than a TTI of the first cell. In some cases, the priority transmission comprises multiple priority transmissions using the first TTI during a single instance of the TTI of the first cell, and wherein the communications with a UE are muted during each of the multiple priority transmissions.

In some cases, the first cell is a one-hop adjacent cell of the second cell. In some cases, the message comprises at least one of a priority transmission indicator field, an ID parameter of a priority UE associated with the priority transmission, a location parameter of a priority UE associated with the priority transmission, a timing parameter associated with the first TTI, or combinations thereof. In some cases, the message is received from the second cell via an X2 backhaul communications link.

The communication manager 720 may limit, based on the message, a communication parameter associated with communications between the first cell and a UE during the scheduled priority transmission and communicate with the UE using power fallback parameter during a time selected to overlap with the priority transmissions.

In some cases, the communications between the first cell and the UE are UL communications. In some cases, the communications between the first cell and the UE are DL communications. In some cases, limiting the communication parameter comprises: muting the communications with the UE during a gap time that is selected to align with the scheduled priority transmissions.

The transmitter 725 may transmit signals received from other components of wireless device 700. In some examples, the transmitter 725 may be collocated with a receiver in a transceiver module. For example, the transmitter 725 may be an example of aspects of the transceiver 925 described with reference to FIG. 9. The transmitter 725 may utilize a single antenna, or it may utilize a plurality of antennas.

Figure 8:
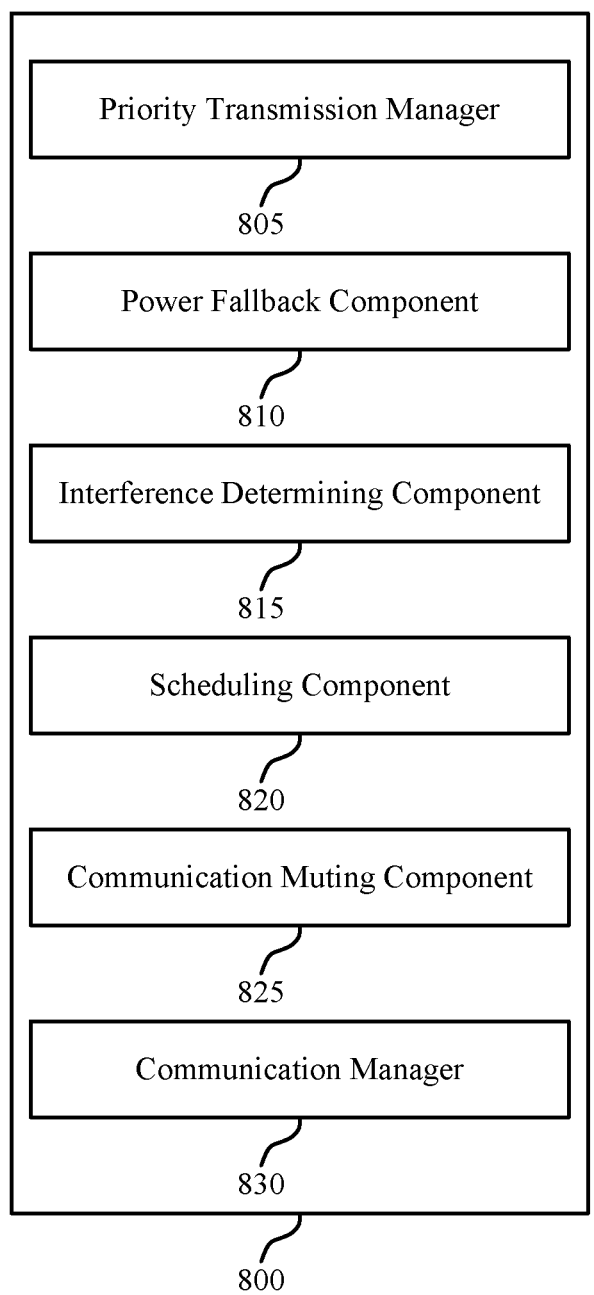

FIG. 8 shows a block diagram of an interference manager 800 which may be an example of the corresponding component of wireless device 600 or wireless device 700. That is, interference manager 800 may be an example of aspects of interference manager 610 or interference manager 710 described with reference to FIGS. 6 and 7, respectively. The interference manager 800 may also be an example of aspects of the interference manager 905 described with reference to FIG. 9.

The interference manager 800 may include priority transmission manager 805, power fallback component 810, interference determining component 815, scheduling component 820, communication muting component 825 and communication manager 830. Each of these modules may communicate, directly or indirectly, with one another (e.g., via one or more buses).

The priority transmission manager 805 may receive, at a first cell, a message indicating that a second cell has a priority transmission scheduled using a first TTI, the first TTI shorter in duration than a TTI of the first cell.

In some cases, limiting the communication parameter comprises: identifying, based on the communications with the UE being a DL communication, a power fallback parameter associated with the DL communications. The power fallback component 810 may determine that the DL communications with the UE using the power fallback parameter will not interfere with the priority transmission.

The interference determining component 815 may determine that the interference caused by communications with the UE is below the interference threshold is based on at least one of a location of the UE within a coverage area of the first cell, an interference level of the communications with the UE being below a threshold value, converting a DL communication with the UE to an UL communication with the UE, or combinations thereof.

In some cases, limiting the communication parameter comprises: determining that communications with the UE cause interference with the priority transmission that is below an interference threshold. In some cases, limiting the communication parameter comprises: determining that communications with the UE will interfere with the priority transmission. In some cases, limiting the communication parameter comprises: determining that communications with the UE and with at least one other UE will not interfere with the priority transmission.

The scheduling component 820 may schedule the UE for communications during a time selected to overlap with the priority transmissions using the first TTI based on the determining, refrain from scheduling the UE for communications during the priority transmission, and schedule the UE and the at least one other UE for communications using the TTI and according to a TDM scheme.

The communication muting component 825 may, determine a gap time that comprises a duration that is the same as the first TTI. The communication manager 830 may communicate with the UE using the power fallback parameter and during a time selected to overlap with the priority transmissions, and limit, based on the message, a communication parameter associated with communications between the first cell and a UE during the scheduled priority transmission.

Figure 9:
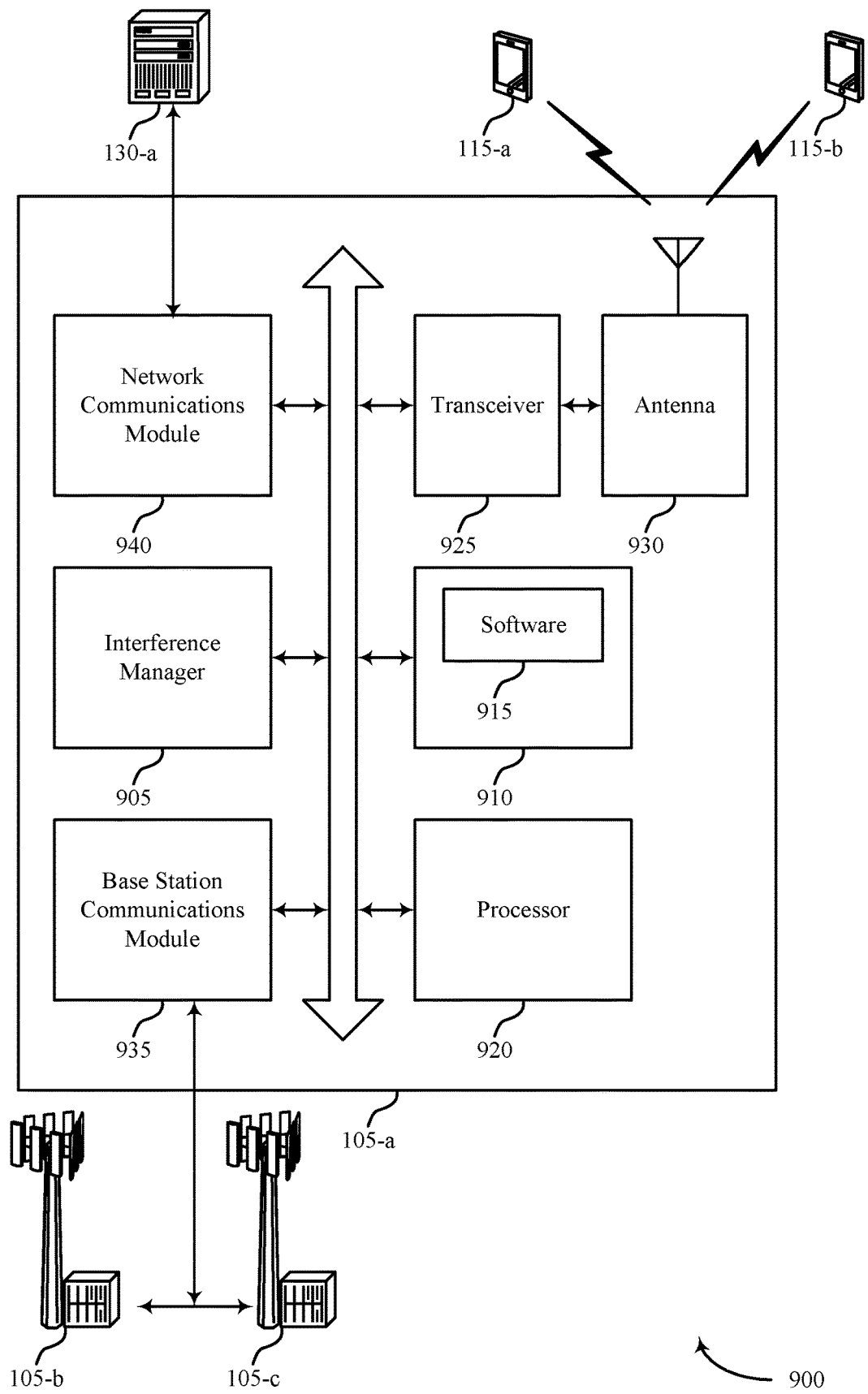
FIG. 9 illustrates a block diagram of a system including a base station that supports interference management with variable TTIs in accordance with aspects of the present disclosure.

FIG. 9 shows a diagram of a wireless system 900 including a device configured that supports interference management with variable TTIs in accordance with various aspects of the present disclosure. For example, the wireless system 900 may include base station 105-a, which may be an example of a cell 2, a wireless device 600, a wireless device 700, or a base station 105 as described with reference to FIGS. 1 through 8. Base station 105-a may also include components for bi-directional voice and data communications including components for transmitting communications and components for receiving communications. For example, base station 105-a may communicate bi-directionally with one or more UEs 115, such as UEs 115-a and/or UE 115-b.

Base station 105-a may also include interference manager 905, memory 910, processor 920, transceiver 925, antenna 930, base station communications module 935 and network communications module 940. Each of these modules may communicate, directly or indirectly, with one another (e.g., via one or more buses). The interference manager 905 may be an example of an interference manager as described with reference to FIGS. 6 through 8.

The memory 910 may include random access memory (RAM) and read only memory (ROM). The memory 910 may store computer-readable, computer-executable software 915 including instructions that, when executed, cause the processor to perform various functions described herein (e.g., interference management with variable TTIs, etc.). In some cases, the computer-executable software 915 may not be directly executable by the processor 920 but may cause a computer (e.g., when compiled and executed) to perform functions described herein. The processor 920 may include an intelligent hardware device, (e.g., a central processing unit (CPU), a microcontroller, an application specific integrated circuit (ASIC), etc.)

The transceiver 925 may communicate bi-directionally, via one or more antennas, wired, or wireless links, with one or more networks, as described above. For example, the transceiver 925 may communicate bi-directionally with a base station 105 or a UE 115. The transceiver 925 may also include a modem to modulate the packets and provide the modulated packets to the antennas for transmission, and to demodulate packets received from the antennas. In some cases, the base station 105-a may include a single antenna 930. However, in some cases the base station 105-a may have more than one antenna 930, which may be capable of concurrently transmitting or receiving multiple wireless transmissions.

The base station communications module 935 may manage communications with other base stations 105 (e.g., base stations 105-b and/or 105-c), and may include a controller or scheduler for controlling communications with UEs 115 in cooperation with other base stations 105. For example, the base station communications module 935 may coordinate scheduling for transmissions to UEs 115 for various interference mitigation techniques such as beamforming or joint transmission. In some examples, base station communications module 935 may provide an X2 interface within an LTE/LTE-A wireless communication network technology to provide communication between base stations 105.

The network communications module 940 may manage communications with the core network (e.g., via one or more wired backhaul links). For example, the network communications module 940 may manage the transfer of data communications for client devices, such as one or more UEs 115.

Figure 10:
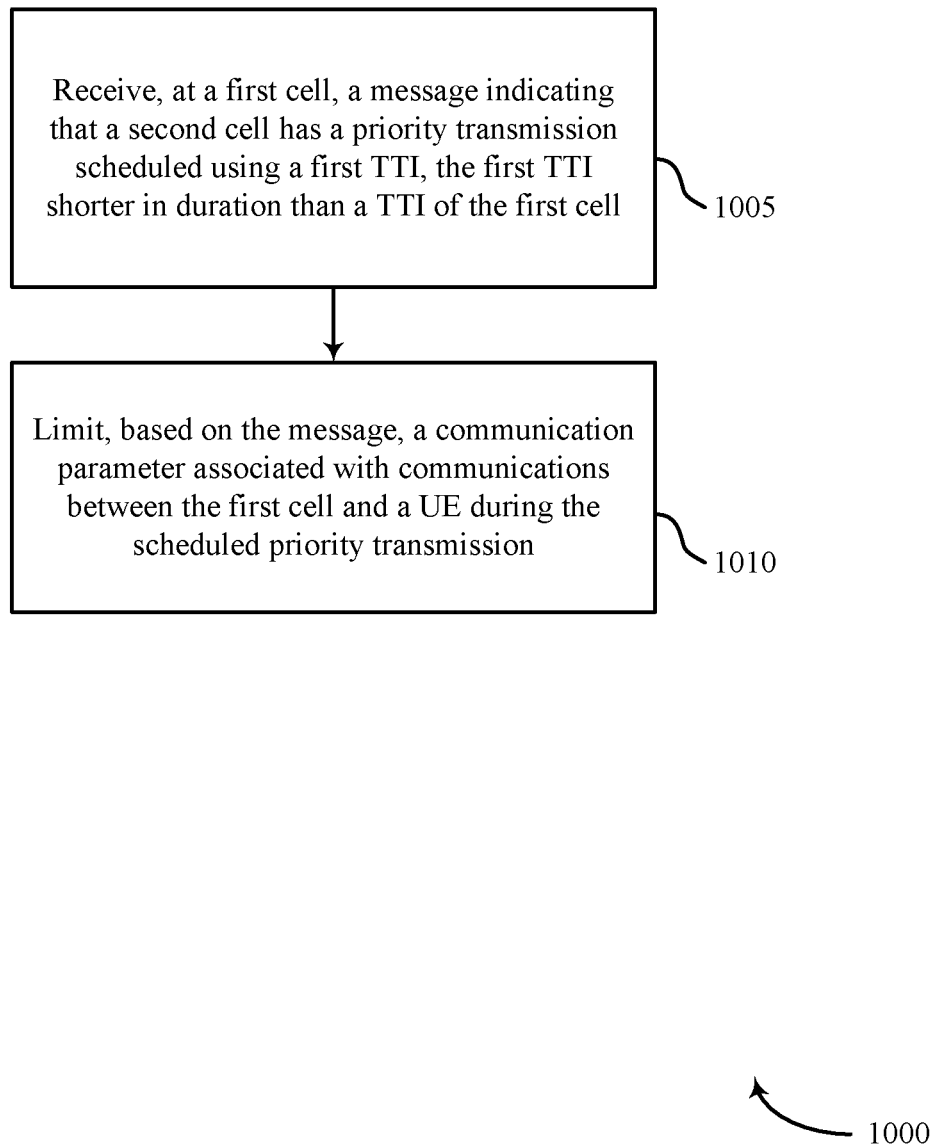
FIGS. 10 through 12 illustrate methods for interference management with variable TTIs in accordance with aspects of the present disclosure.

FIG. 10 shows a flowchart illustrating a method 1000 for interference management with variable TTIs in accordance with various aspects of the present disclosure. The operations of method 1000 may be implemented by a device such as a cell or base station 105 or its components as described with reference to FIGS. 1 through 5. For example, the operations of method 1000 may be performed by the interference manager as described herein. In some examples, the base station 105 may execute a set of codes to control the functional elements of the device to perform the functions described below. Additionally or alternatively, the base station 105 may perform aspects the functions described below using special-purpose hardware.

At block 1005, the base station 105 may receive, at a first cell, a message indicating that a second cell has a priority transmission scheduled using a first TTI, the first TTI shorter in duration than a TTI of the first cell as described above with reference to FIGS. 2 through 5. In some examples, the operations of block 1005 may be performed by the priority transmission manager as described with reference to FIGS. 7 and 8.

At block 1010, the base station 105 may limit, based on the message, a communication parameter associated with communications between the first cell and a UE during the scheduled priority transmission as described above with reference to FIGS. 2 through 5. In some examples, the operations of block 1010 may be performed by the communication manager as described with reference to FIGS. 7 and 8.

Figure 11:
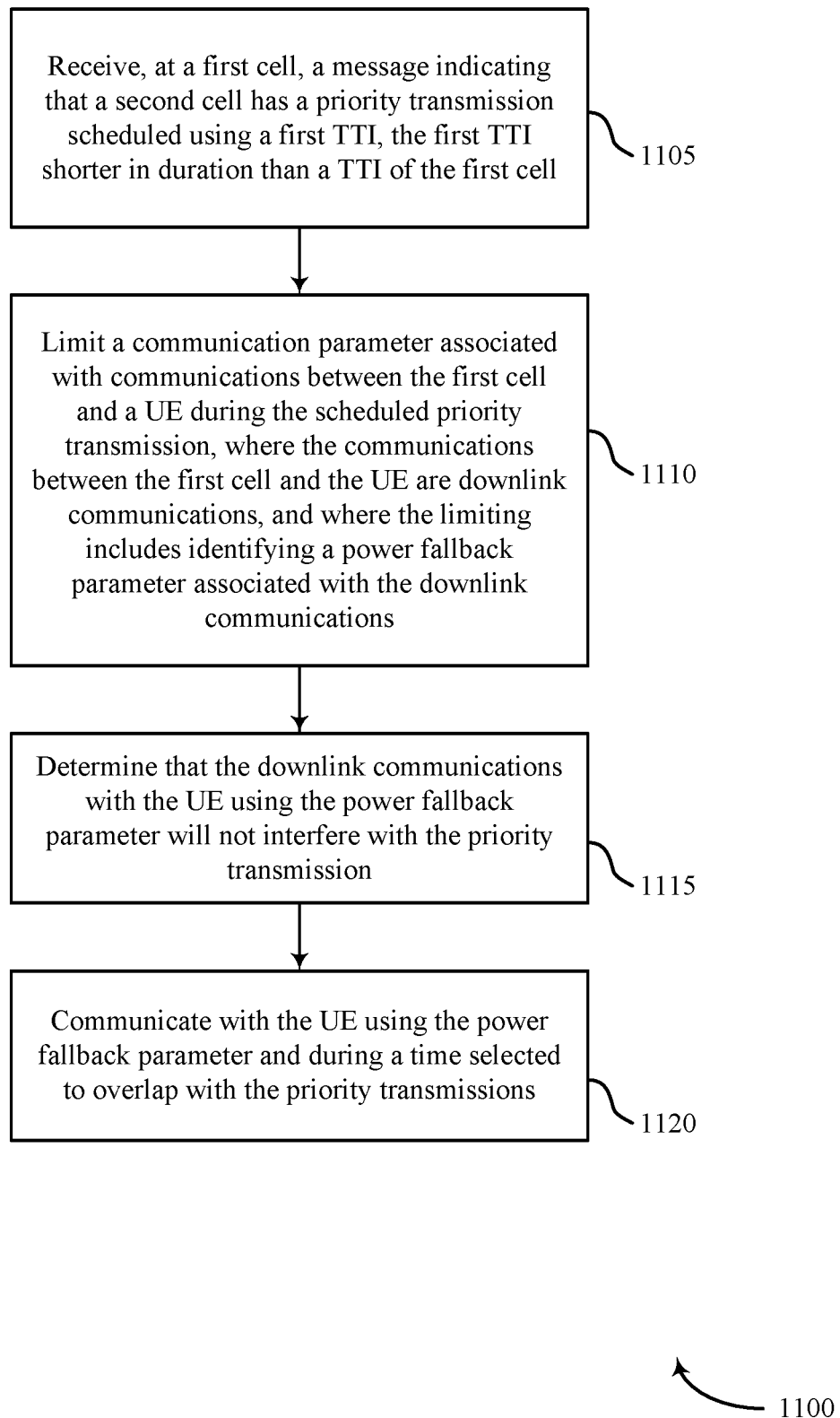

FIG. 11 shows a flowchart illustrating a method 1100 for interference management with variable TTIs in accordance with various aspects of the present disclosure. The operations of method 1100 may be implemented by a device such as a cell or base station 105 or its components as described with reference to FIGS. 1 through 5. For example, the operations of method 1100 may be performed by the interference manager as described herein. In some examples, the base station 105 may execute a set of codes to control the functional elements of the device to perform the functions described below. Additionally or alternatively, the base station 105 may perform aspects the functions described below using special-purpose hardware.

At block 1105, the base station 105 may receive, at a first cell, a message indicating that a second cell has a priority transmission scheduled using a first TTI, the first TTI shorter in duration than a TTI of the first cell as described above with reference to FIGS. 2 through 5. In some examples, the operations of block 1105 may be performed by the priority transmission manager as described with reference to FIGS. 7 and 8.

At block 1110, the base station 105 may limit, based on the message, a communication parameter associated with communications between the first cell and a UE during the scheduled priority transmission as described above with reference to FIGS. 2 through 5. In some cases, the communications between the first cell and the UE are DL communications. In some cases, limiting the communication parameter comprises: identifying, based on the communications with the UE being a DL communication, a power fallback parameter associated with the DL communications. In some examples, the operations of block 1110 may be performed by the communication manager as described with reference to FIGS. 7 and 8.

At block 1115, the base station 105 may determine that the DL communications with the UE using the power fallback parameter will not interfere with the priority transmission as described above with reference to FIGS. 2 through 5. In some examples, the operations of block 1115 may be performed by the power fallback component as described with reference to FIGS. 7 and 8.

At block 1120, the base station 105 may communicate with the UE using the power fallback parameter and during a time selected to overlap with the priority transmissions as described above with reference to FIGS. 2 through 5. In some examples, the operations of block 1120 may be performed by the communication manager as described with reference to FIGS. 7 and 8.

Figure 12:
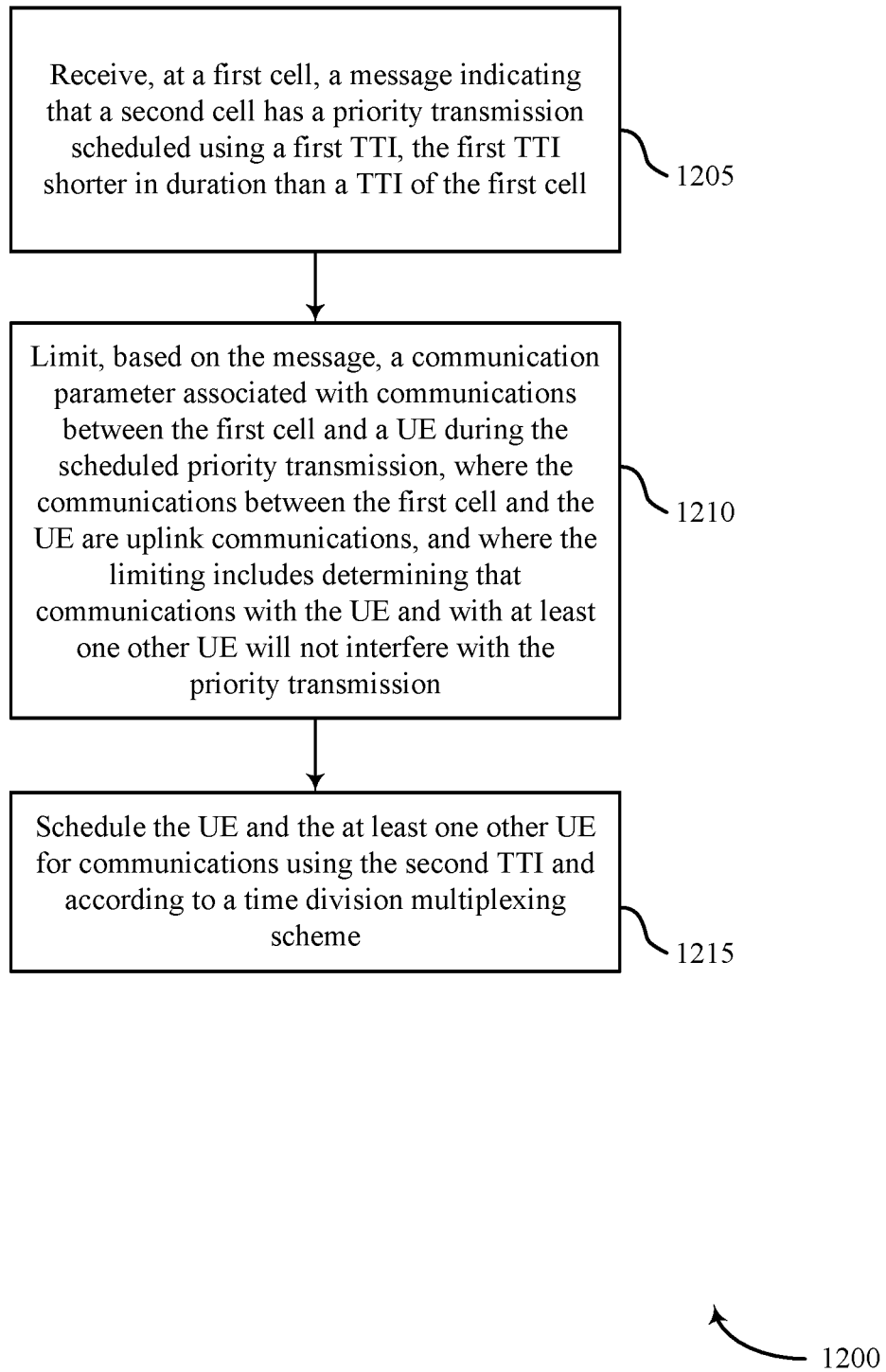

FIG. 12 shows a flowchart illustrating a method 1200 for interference management with variable TTIs in accordance with various aspects of the present disclosure. The operations of method 1200 may be implemented by a device such as a cell or base station 105 or its components as described with reference to FIGS. 1 through 5. For example, the operations of method 1200 may be performed by the interference manager as described herein. In some examples, the base station 105 may execute a set of codes to control the functional elements of the device to perform the functions described below. Additionally or alternatively, the base station 105 may perform aspects the functions described below using special-purpose hardware.

At block 1205, the base station 105 may receive, at a first cell, a message indicating that a second cell has a priority transmission scheduled using a first TTI, the first TTI shorter in duration than a TTI of the first cell as described above with reference to FIGS. 2 through 5. In some examples, the operations of block 1205 may be performed by the priority transmission manager as described with reference to FIGS. 7 and 8.

At block 1210, the base station 105 may limit, based on the message, a communication parameter associated with communications between the first cell and a UE during the scheduled priority transmission as described above with reference to FIGS. 2 through 5. In some cases, the communications between the first cell and the UE are UL communications. In some cases, limiting the communication parameter comprises: determining that communications with the UE and with at least one other UE will not interfere with the priority transmission. In some examples, the operations of block 1210 may be performed by the communication manager as described with reference to FIGS. 7 and 8.

At block 1215, the base station 105 may schedule the UE and the at least one other UE for communications using the TTI and according to a TDM scheme as described above with reference to FIGS. 2 through 5. In some examples, the operations of block 1215 may be performed by the scheduling component as described with reference to FIGS. 7 and 8.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for interference management with variable TTIs.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different PHY locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a non-transitory computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 through 500 of FIGS. 1 through 5 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for interference management with variable TTIs. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
  receiving, at a first cell, a message indicating that a second cell has a priority transmission scheduled using a first transmission time interval (TTI), the first TTI shorter in duration than a common TTI used by the first cell and the second cell;
  identifying a power fallback parameter associated with communications between the first cell and a user equipment (UE) during the scheduled priority transmission;
  limiting, based at least in part on the message and identifying the power fallback parameter, a communication parameter associated with the communications between the first cell and the UE during the scheduled priority transmission to the power fallback parameter during a gap time that is selected to align with the scheduled priority transmission; and
  communicating with the UE using the power fallback parameter and during the gap time.

2. The method of claim 1, wherein the communications between the first cell and the UE are downlink (DL) communications.

3. The method of claim 1, wherein the gap time comprises a duration that is the same as the first TTI.

4. The method of claim 1, wherein the priority transmission comprises multiple priority transmissions using the first TTI during a single instance of the TTI of the first cell, and wherein the communications with the UE are muted during each of the multiple priority transmissions.

5. The method of claim 2, further comprising:
  determining that the DL communications with the UE using the power fallback parameter will not interfere with the priority transmission.

6. The method of claim 2, further comprising:
  determining that the communications with the UE cause interference with the priority transmission that is below an interference threshold; and
  scheduling the UE for the communications during a time selected to overlap with the priority transmission using the first TTI based at least in part on determining that the interference caused by the communications with the UE is below the interference threshold.

7. The method of claim 6, further comprising:
  determining that the interference caused by the communications with the UE is below the interference threshold is based on at least one of a location of the UE within a coverage area of the first cell, an interference level of the communications with the UE being below a threshold value, or converting a DL communication with the UE to an uplink (UL) communication with the UE.

8. The method of claim 2, wherein limiting the communication parameter comprises:
determining that the communications with the UE will interfere with the priority transmission; and
refraining from scheduling the UE for the communications during the priority transmission.

9. The method of claim 1, wherein the communications between the first cell and the UE are UL communications.

10. The method of claim 9, wherein limiting the communication parameter comprises:
determining that the communications with the UE and with at least one other UE will not interfere with the priority transmission; and
scheduling the UE and the at least one other UE for the communications using the TTI and according to a time division multiplexing (TDM) scheme.

11. The method of claim 1, wherein the first cell is a one-hop adjacent cell of the second cell.

12. The method of claim 1, wherein the message comprises at least one of a priority transmission indicator field, an identification (ID) parameter of a priority UE associated with the priority transmission, a location parameter of the priority UE associated with the priority transmission, or a timing parameter associated with the first TTI.

13. The method of claim 1, wherein the message is received from the second cell via an X2 backhaul communications link.

14. The method of claim 1, wherein the first TTI is a flexible TTI.

15. The method of claim 1, wherein the first TTI is dynamically selected.

16. An apparatus for wireless communication comprising:
means for receiving, at a first cell, a message indicating that a second cell has a priority transmission scheduled using a first transmission time interval (TTI), the first TTI shorter in duration than a common TTI used by the first cell and the second cell;
means for identifying a power fallback parameter associated with communications between the first cell and a user equipment (UE) during the scheduled priority transmission;
means for limiting, based at least in part on the message and means for identifying the power fallback parameter, a communication parameter associated with the communications between the first cell and the UE during the scheduled priority transmission to the power fallback parameter during a gap time that is selected to align with the scheduled priority transmission; and
means for communicating with the UE using the power fallback parameter and during the gap time.

17. The apparatus of claim 16, wherein the communications between the first cell and the UE are downlink (DL) communications.

18. The apparatus of claim 16, wherein the gap time comprises a duration that is the same as the first TTI.

19. The apparatus of claim 16, wherein the priority transmission comprises multiple priority transmissions using the first TTI during a single instance of the TTI of the first cell, and wherein the communications with the UE are muted during each of the multiple priority transmissions.

20. The apparatus of claim 17, wherein the means for limiting the communication parameter comprises:

means for identifying, based at least in part on the communications with the UE being a DL communication, the power fallback parameter associated with the DL communications;
means for determining that the DL communications with the UE using the power fallback parameter will not interfere with the priority transmission; and
means for communicating with the UE using the power fallback parameter and during a time selected to overlap with the priority transmission.

21. The apparatus of claim 17, further comprising:
means for determining that the communications with the UE cause interference with the priority transmission that is below an interference threshold; and
means for scheduling the UE for the communications during a time selected to overlap with the priority transmission using the first TTI based at least in part on determining that the interference caused by the communications with the UE is below the interference threshold.

22. The apparatus of claim 21, further comprising:
means for determining that the interference caused by the communications with the UE is below the interference threshold is based on at least one of a location of the UE within a coverage area of the first cell, an interference level of the communications with the UE being below a threshold value, or converting a DL communication with the UE to an uplink (UL) communication with the UE.

23. The apparatus of claim 17, wherein the means for limiting the communication parameter comprises:
means for determining that the communications with the UE will interfere with the priority transmission; and
means for refraining from scheduling the UE for the communications during the priority transmission.

24. The apparatus of claim 16, wherein the communications between the first cell and the UE are UL communications.

25. The apparatus of claim 24, wherein the means for limiting the communication parameter comprises:
means for determining that the communications with the UE and with at least one other UE will not interfere with the priority transmission; and
means for scheduling the UE and the at least one other UE for the communications using the TTI and according to a time division multiplexing (TDM) scheme.

26. An apparatus for wireless communication, comprising:
a processor;
memory in electronic communication with the processor; and
instructions stored in the memory and operable, when executed by the processor, to cause the apparatus to:
receive, at a first cell, a message indicating that a second cell has a priority transmission scheduled using a first transmission time interval (TTI), the first TTI shorter in duration than a common TTI used by the first cell and the second cell;
identify a power fallback parameter associated with communications between the first cell and a user equipment (UE) during the scheduled priority transmission;
limit, based at least in part on the message and identifying the power fallback parameter, a communication parameter associated with the communications between the first cell and the UE during the scheduled priority transmission to the power fallback parameter during a gap time that is selected to align with the scheduled priority transmission; and communicate with the UE using the power fallback parameter and during the gap time.

27. The apparatus of claim 26, wherein the communications between the first cell and the UE are downlink (DL) communications.

28. The apparatus of claim 26, wherein the gap time comprises a duration that is the same as the first TTI.

29. The apparatus of claim 26, wherein the priority transmission comprises multiple priority transmissions using the first TTI during a single instance of the TTI of the first cell, and wherein the communications with the UE are muted during each of the multiple priority transmissions.

30. The apparatus of claim 27, wherein limiting the communication parameter further comprises instructions operable to cause the processor to:

identify, based at least in part on the communications with the UE being a DL communication, the power fallback parameter associated with the DL communications;

determine that the DL communications with the UE using the power fallback parameter will not interfere with the priority transmission; and communicate with the UE using the power fallback parameter and during a time selected to overlap with the priority transmission.

31. The apparatus of claim 27, wherein the instructions are operable to cause the processor to:

determine that the communications with the UE cause interference with the priority transmission that is below an interference threshold; and schedule the UE for the communications during a time selected to overlap with the priority transmission using the first TTI based at least in part on determining that the interference caused by the communications with the UE is below the interference threshold.

32. The apparatus of claim 31, wherein the instructions are operable to cause the processor to:

determine that the interference caused by the communications with the UE is below the interference threshold is based on at least one of a location of the UE within a coverage area of the first cell, an interference level of the communications with the UE being below a threshold value, or converting a DL communication with the UE to an uplink (UL) communication with the UE.

33. The apparatus of claim 27, wherein limiting the communication parameter further comprises instructions operable to cause the processor to:

determine that the communications with the UE will interfere with the priority transmission; and refrain from scheduling the UE for the communications during the priority transmission.

34. The apparatus of claim 26, wherein the communications between the first cell and the UE are UL communications.

35. The apparatus of claim 34, wherein limiting the communication parameter further comprises instructions operable to cause the processor to:

determine that the communications with the UE and with at least one other UE will not interfere with the priority transmission; and schedule the UE and the at least one other UE for the communications using the TTI and according to a time division multiplexing (TDM) scheme.

36. The apparatus of claim 26, wherein the first cell is a one-hop adjacent cell of the second cell.

37. The apparatus of claim 26, wherein the message comprises at least one of a priority transmission indicator field, an identification (ID) parameter of a priority UE associated with the priority transmission, a location parameter of the priority UE associated with the priority transmission, or a timing parameter associated with the first TTI.

38. The apparatus of claim 26, wherein the message is received from the second cell via an X2 backhaul communications link.

39. A non-transitory computer-readable medium storing code for wireless communication, the code comprising instructions executable to:

receive, at a first cell, a message indicating that a second cell has a priority transmission scheduled using a first transmission time interval (TTI), the first TTI shorter in duration than a common TTI used by the first cell and the second cell;

identify a power fallback parameter associated with communications between the first cell and a user equipment (UE) during the scheduled priority transmission;

limit, based at least in part on the message and identifying the power fallback parameter, a communication parameter associated with the communications between the first cell and the UE during the scheduled priority transmission to the power fallback parameter during a gap time that is selected to align with the scheduled priority transmission; and communicate with the UE using the power fallback parameter and during the gap time.

* * * * *